June 7, 1949.

R. L. SMITH 2,472,551

METHOD FOR PRODUCING SURFACE
DECORATED PLASTIC SHEETS
Filed May 10, 1946

Inventor:
Robert L. Smith
By Emery, Booth, Townsend, Miller & Widner
Attys.

Patented June 7, 1949

2,472,551

UNITED STATES PATENT OFFICE 2,472,551

METHOD FOR PRODUCING SURFACE DECORATED PLASTIC SHEETS

Robert L. Smith, Amherst, N. H., assignor to Nashua Gummed and Coated Paper Company, Nashua, N. H., a corporation of Massachusetts Application May 10, 1946, Serial No. 668,781

4 Claims. (Cl. 18—47.5)

In the field of plastics, using that word in its present popular sense, materials are available in the form of self-sustaining thin waterproof sheets which are readily extensible to a degree suggestive of that of vulcanized sheet rubber of similar thickness and which resiliently recover from such expansion although usually at a relatively slow rate as compared with rubber. Commercial products having these properties and belonging to the general class of vinyl resins are now well known. They may be polymers of vinyl chloride or copolymers of vinyl chloride and acetate with suitable plasticizers. Herein, however, we are concerned with the physical properties of the sheet rather than its chemical character.

Plastic sheets as described are applied to various uses, such as shower bath curtains, women's rainwear and so on, wherein a surface decoration would be desirable. Because the area of the sheet is subject to marked local distortion under the traction strains which arise in handling it during processing, the application of such decorations thereto is severely restricted. Thus printed designs wherein a geometrical regularity is desired are not practical and especially multi-color work involving the registration of different impressions. Another example is the application of flock to give a suede-like or velvet-like surface either over the entire area or in the form of a design wherein a uniform application in the area covered has not been found practicable. In the preparation of a flocked surface imitating velour the web should be vibrated during coating to obtain proper attachment and orientation of the fibers. For proper vibration the web must be thin and in the case of plastics of the kind under consideration so thin as to be incapable of maintaining its dimensions during the process. This difficulty is obviated by the present invention.

Figure 1:
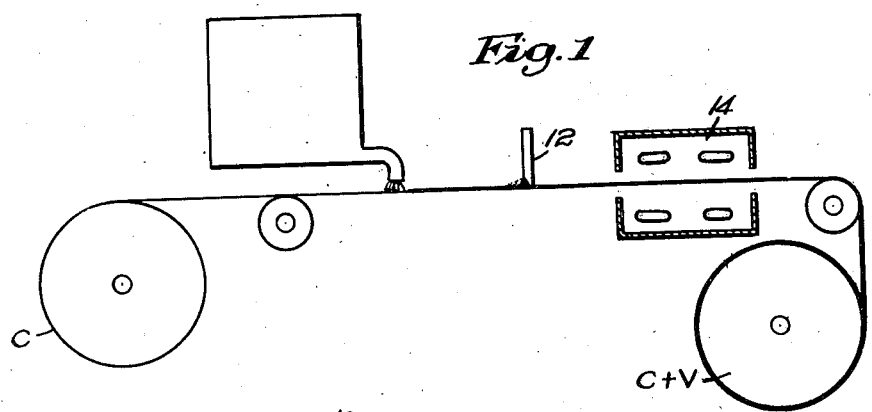
Figure 2:
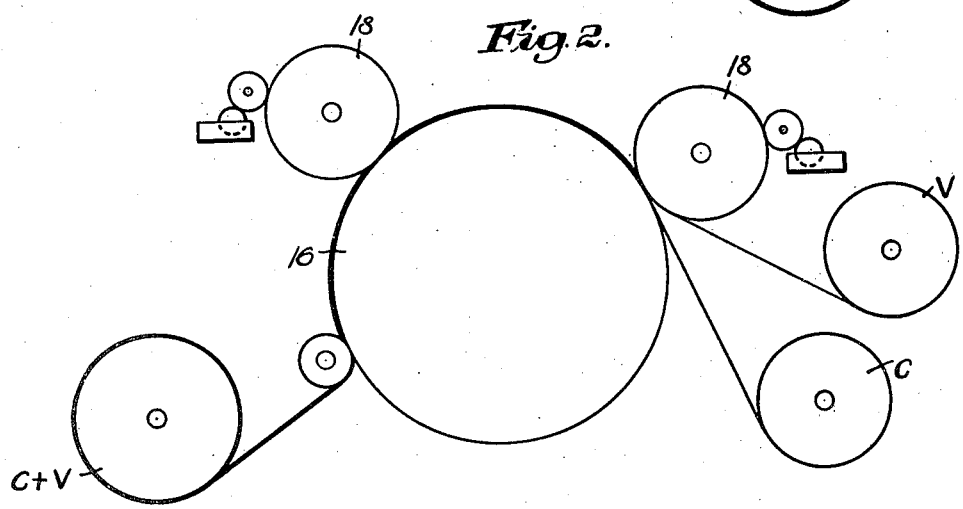
Figure 3:
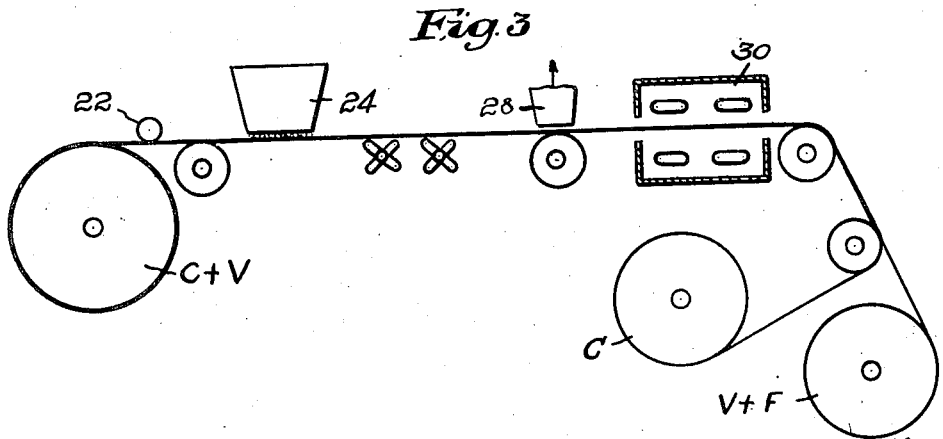

My invention provides a method whereby a surface decoration of such readily extensible plastic is made possible. The method will be fully understood by reference to the following description taken in connection with the accompanying drawings, wherein:

Fig. 1 is a diagram illustrating the formation of a plastic sheet in situ on a flexible carrier strip, Fig. 2 is a diagrammatic view illustrating the decoration of material prepared as in Fig. 1, by means of multicolor printing, and Fig. 3 is a diagrammatic view illustrating the decoration of a material prepared as in Fig. 1 by the application thereto of flock.

In accordance with my invention I form the plastic sheet in situ on a co-extensive substantially inextensible flexible carrier strip (which usually will be of paper) in such manner that it coheres strongly thereto to permit the two to be handled as a unit in the necessary steps of further processing involving, for example, traction through or bending around printing rolls or the like, or vibration of the web incidental to the application of flock, the dimensional instability of the plastic being inhibited during such processing by the carrier. The word "cohere" as just used contrasts with a bond involving interlock of the opposed surfaces or their junction by a medium so interlocking as is characteristic of adhesive joints. Such cohesion is familiar in various examples varying from a wet undershirt to a mechanic's gage blocks when wrung together. While the factors which contribute to the effect may vary and be in part obscure, it is convenient to visualize the effect as of two sheets with smooth surfaces in substantially perfect contact bound together by the atmospheric pressures exerted thereon. If, however, the surfaces are pried apart at a point along an edge to admit air between them, the sheets may be stripped one from another readily. In other words, the sheets cleave one to another but one cleaves cleanly from the other.

Clearly a pre-formed sheet or web of the plastic cannot be applied to a carrier sheet because in so doing it would be subject to the distortion which it is desired to avoid. Therefore, as stated, it is formed in situ in substantially unstressed condition on the carrier from an amorphous mass. With proper choice or preparation of the carrier this may be effected by various methods analogous to those by which plastic sheets are now formed by deposit on highly polished metal rolls or belts.

If the vinyl resin is to be cast, as the process is termed, from an organic solvent system, then the carrier may be a web of paper having a surface highly finished to obviate any tooth with which the plastic would interlock and, preferably also, treated with a hydrophilic coating such as glue, protein, polyvinyl alcohol, or methyl cellulose, and therefore repellent to the solvent vehicle and the moisture-resisting plastic.

The plastic may be calendered onto the carrier from a hot melt. In this case the carrier may be super-calendered paper, having its surface characterized by hydrolysis of the cellulose. Glassine paper may be used or a laminated web with one face of glassine. Hydrophilic coatings may be utilized.

Another method of forming the sheet is by deposit of the resin from a dispersion, the deposited particles being then heat-fused together. In this case the carrier may be a sheet as described in the preceding example and it may be coated with a hydrophilic material if the dispersion is in an organic system.

In each of the methods described in the three preceding paragraphs it is apparent that the original material from which the sheet is prepared is plastic batch material which is solidified on the carrier there to assume the form of a sheet as contrasted with the sheeting of an already solid bulk mass.

Referring now to the drawings in Fig. 1, I show a roll of paper or similar material C suitably prepared as herein described. The paper is led toward the right in the figure and the fluid plastic deposited thereon from the container 10. The fluid may be a solution, a melt or a suspension. It is spread out and made even on the face of the sheet by means well known in the art, herein exemplified diagrammatically by the showing of a strickle 12, and passes through a heated chamber 14. The plastic is solidified and the compound roll, designated by the letters C+V, is here shown as rolled up at the right. I do not deem it desirable to attempt to illustrate multiple thicknesses by individual boundary lines in this diagram or the others, but the line representing the advancing web is made somewhat heavier where the material is of increased thickness.

In Fig. 2 I have shown a compound web C+V, such as produced by the step illustrated in Fig. 1, passing through a printing press embodying an impression cylinder 16 and two plate cylinders 18, by means of which a design is imprinted thereon in two colors. At the right of the figure the carrier web C and the plastic web V are shown separated and separately rewound. It will be understood that such separation need not be effected immediately upon the exit of the material from the press, and that the two webs might be rewound together and separated as needed.

Fig. 3 illustrates the decoration of a compound web C+V by the application of flock. Herein adhesive is applied thereto by means of a roller 22 and flock is shaken over the adhesively prepared surface from a container 24. The web is then vibrated by the beater rolls 26, as is customary in the art, to secure proper distribution of the flocking material. Excess flock is sucked off at 28, as indicated by the arrow. The material then passes through a drying oven 30 to set the adhesive and the carrier and the flocked plastic are herein shown as separated and rewound to provide a roll of the original carrier material C and a roll of the flocked plastic indicated by the legend V+F.

In practice the carrier sheet would be a web of indefinite length (a "roll of paper") and the compound unit and the plastic sheet formed as a part thereof would be of like extent. The compound unit may be slit or sheeted as desired. After processing a complete web the carrier may be reclaimed for reuse.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. The method of preparing a surface decorated, unitary, self-sustaining sheet of a flexible, readily extensible, resilient plastic which comprises forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres to provide a fissionable assemblage manipulable as a unit, processing as a unit the two coherent sheets by securing decorative material to the exposed surface of the plastic sheet while maintained against distortion of area by the thereto cohering carrier sheet, and thereafter stripping from the carrier sheet the decorated plastic sheet as a self-sustaining unit.

2. The method of preparing a surface decorated, unitary, self-sustaining sheet of a flexible, readily extensible, resilient plastic which comprises forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres to provide a fissionable assemblage manipulable as a unit, processing as a unit the two coherent sheets by printing a design on the exposed face of the plastic sheet while the latter is maintained by the thereto cohering carrier sheet and thereafter stripping from the carrier sheet the plastic sheet as a self-sustaining unit.

3. The method of preparing a surface decorated, unitary, self-sustaining sheet of a flexible, readily extensible, resilient plastic which comprises forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres to provide a fissionable assemblage manipulable as a unit, processing as a unit the two coherent sheets by printing on the exposed face of the plastic sheet a design which includes coordinated portions in multicolor while said plastic sheet is maintained by the thereto cohering carrier sheet and thereafter stripping from the carrier sheet the plastic sheet as a self-sustaining unit.

4. The method of preparing a surface decorated, unitary, self-sustaining sheet of a flexible, readily extensible, resilient plastic which comprises forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres to provide a fissionable assemblage manipulable as a unit, processing as a unit the two coherent sheets by adhesively securing flock to at least a portion of the exposed area of the plastic sheet in substantially uniform distribution throughout said area, while said plastic sheet is maintained by the thereto cohering carrier sheet and thereafter stripping from the carrier sheet the plastic sheet as a self-sustaining unit.

ROBERT L. SMITH.

REFERENCES CITED

The following references are of record in the file of this patent:

UNITED STATES PATENTS

| Number | Name | Date |
|---|---|---|
| 1,516,598 | Griffiths | Nov. 25, 1924 |
| 1,895,711 | Foley | Jan. 31, 1933 |
| 2,183,520 | Von Derhoff | Dec. 19, 1939 |
| 2,327,627 | Esselen | Aug. 24, 1943 |
| 2,349,153 | Ferrante | May 16, 1944 |
| 2,353,717 | Francis | July 18, 1944 |